Feb. 11, 1969

G. C. WALKER 3,426,879

COUNTERFEIT DOCUMENT SECURITY SYSTEM

Filed May 19, 1967

Sheet _1_ of 5

FIG. I

INVENTOR
GENE C. WALKER

Richards, Harris & Hubbard
ATTORNEY

United States Patent Office 3,426,879
Patented Feb. 11, 1969

3,426,879
COUNTERFEIT DOCUMENT SECURITY SYSTEM
Gene Cowden Walker, Dallas, Tex., assignors, by mesne assignments, to Docutel, Inc., Dallas, Tex., a corporation of Delaware
Filed May 19, 1967, Ser. No. 639,717
U.S. Cl. 194—4          15 Claims
Int. Cl. G07f 3/00; B07c 5/34

ABSTRACT OF THE DISCLOSURE

Apparatus for document verification including a testing area wherein the genuineness of a document is determined. After passing through the testing area a document is transported to a first receiver bin if found genuine and to a second receiver bin if counterfeit. A random sampling system selects a given number of documents from the total submitted to the system to be directed to the second receiver bin regardless of whether genuine or counterfeit. All documents directed into the second receiver bin actuate an alarm circuit to notify an operator.

Background of the invention

A recent study has concluded that counterfeit currency, credit cards, or similar documents exist in three classes of gradation with respect to ease of detection. Documents in Class 1 are considered to be so well produced that they consistently escape detection by skilled humans and the most sophisticated document verification machines. The second class of counterfeit documents are considered to be produced well enough to escape detection by most humans and the ordinary verification machine. Counterfeit documents in Class 3 are considered to be produced in such poor quality that reliable detection by most humans and machines is possible. After an expensive and time consuming investigation, it has been determined that a skilled human is the best means of detecting a counterfeit document. Machines are available, however, to detect substantially all documents in Class 3 and some Class 2 documents.

Automatic document identification by comparison with a true standard is well known and numerous machines have been constructed to provide advice for verification. In the case of paper money, the engraving on a portion of a bill under examination is generally used for identification, this portion being compared to a standard mask either by transmission through the bill or by reflection from its surface. The extent and character of the resultant light is analyzed by electronic circuits and the result indicates the validity of the bill. These document verification systems are used in conjunction with a system for vending an item or credit of value.

Within recent years the demands of the growing vending machine business has necessitated the development of paper currency operated vending machines. Primarily, the need for currency operated vending machines is the result of a desire to vend higher priced merchandise. Coin operated machines are usually limited to vending lower priced items of twenty-five cents or less. In addition, vending machines are now being considered as depositories for banks and other financial and commercial institutions. Any vending machine which vends an item of value, such as cash, money orders, etc., faces the risk of vending, upon receipt of a counterfeit document. Thus, a practical requirement for all vending machines is that it be able to recognize all counterfeit documents except those of Class 1 which are so well produced so as to escape detection by an experienced human, such as a bank teller or cashier. Unfortunately, such machines are not available, with present machines being limited to almost full protection against documents of Class 3 and only partial detection of Class 2 counterfeit documents.

In accordance with this invention, there is provided a system that randomly selects documents submitted to a vending machine and retains them in an inaccessible manner as samples for human verification before completing a vending operation. The sample size is variable from 0% to 100% of the documents presented to the machine. A system is also provided wherein all documents determined to be counterfeit, in addition to documents selected by the sampling operation, are retained in the machine for human verification. Such a system has a two-fold effect, (1) it prevents vending an item upon receipt of a detectable counterfeit document and (2) it deters questionable characters from submitting known counterfeit documents even of Class 1 since there is always a chance it will be the document that is randomly sampled for human verification.

Presently, document verification vending machines are available which are designed to photograph the person submitting a detected counterfeit document. However, it is obvious that such devices are of little use to deter a professional counterfeiter since he will merely side-step the view of the camera. Thus, these machines are of little benefit to deter the counterfeiter from attempting to pass bogus bills in a vending machine. Also, a counterfeit document in Class 1 would be passed by such machines and a vend completed.

Summary of the invention

A counterfeit document security system includes a testing area in a housing to determine the genuineness of a document. The system also includes a first receiving bin for holding documents determined to be genuine by the testing area, gating means for deflecting a document from the first receiver bin, and a second receiver bin for holding documents deflected by the gating means. The gating means is actuated either by the testing area when it determines a document to be counterfeit or randomly by a signal from a random-signal generator.

A more complete understanding of the invention and its advantages will be apparent from the specification and claims and from the accompanying drawings illustrative of the invention.

Brief description of the drawings

FIGURE 4 is a schematic of an override circuit for the security system of FIGURE 3.

Description of the preferred embodiment

Figure 1:
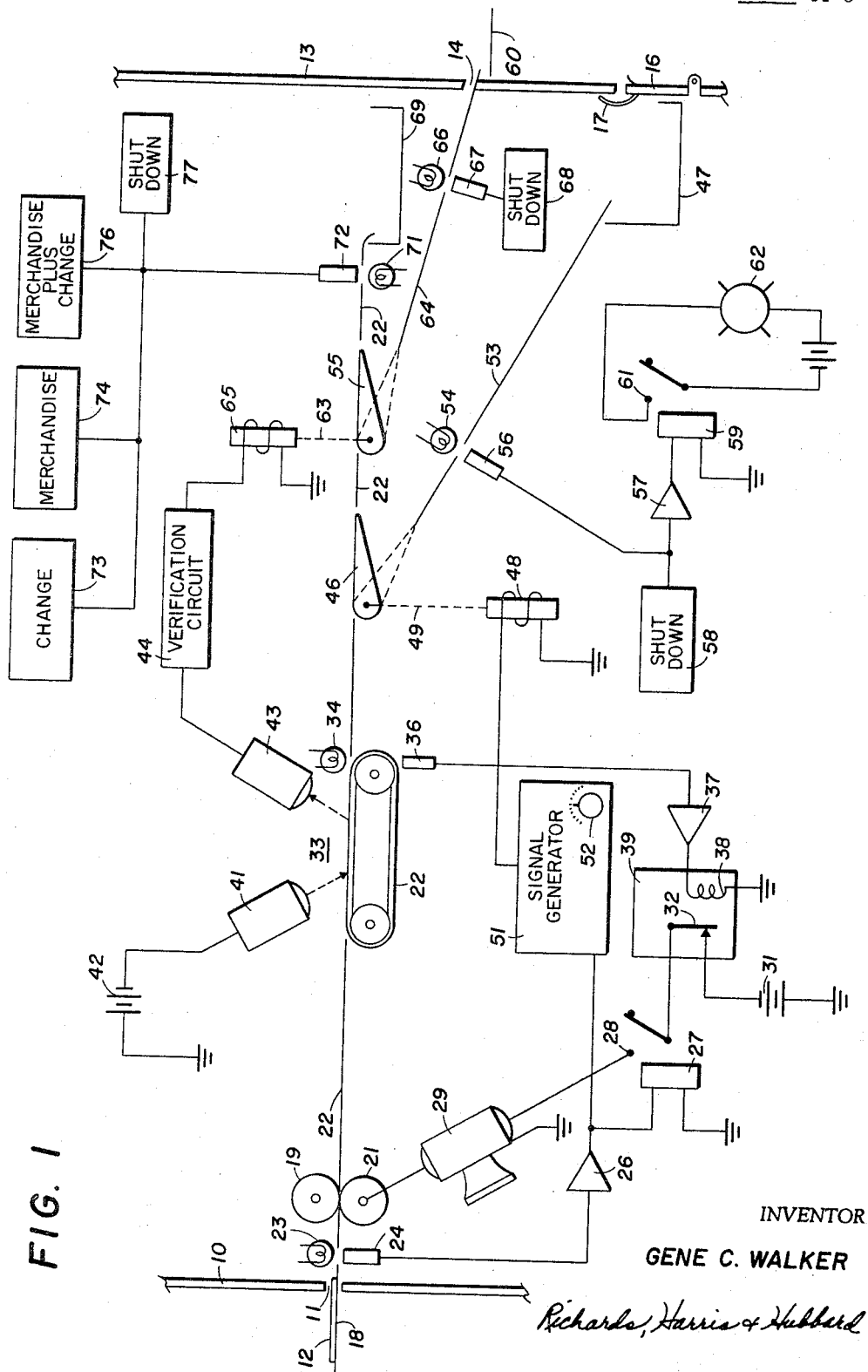
FIGURE 1 is a schematic of a document verification system wherein randomly sampled documents are deflected to one bin, counterfeit documents are returned to the customer, and genuine documents not randomly sampled actuate a vending operation.

Referring to FIGURE 1, there is shown a housing, largely broken away, having a front wall 10 with an opening 11 for receiving a document 12 and a rear wall 13 having an opening 14 for discharging counterfeit documents and a hinged door 16 secured in the position shown by means of a lock 17. The housing completely encloses the verification equipment with only the openings 11 and 14 being available for use by a customer. The area of the housing inside the door 16 is accessible only to authorized personnel having a key for the lock 17.

A customer places the document 12, e.g., paper currency, on a tray 18 and pushes it through the opening 11 until it engages transporting rollers 19 and 21 that are part of a transportation belt 22. As the document 12 is inserted through the opening 11, it interrupts a beam of light to a photocell 24 from a lamp 23 thereby generating input signal to an amplifier 26. The output of the amplifier 26 energizes a relay 27, and a normally open contact 28 is closed. Closing the normally open contact 28 connects a motor 29, mechanically coupled to the transporting roller 21, to a source of D.C. voltage, illustrated schematically as a battery 31, through a normally closed contact 32. The motor 29 rotates the transporting rollers 19 and 21 and the document 12 advances on the moving belt 22 to a testing area 33.

As the leading edge of the document 12 reaches the farthermost end of the testing area 33, it interrupts a light beam to a photocell 36 from a lamp 34 thereby generating an input signal to an amplifier 37. The output of the amplifier 37 energizes the coil 38 of a timing-out relay 39 which includes the normally closed contact 32. Energizing the coil 38 opens the normally closed contact 32, and the motor 29 is disconnected from the D.C. source 31. Disconnecting the motor 29 from the D.C. source stops the belt 22 and the document 12 is held in the testing area 33. The testing area 33 indicates generally any one of the many document verification systems presently available for determination of the genuineness of denomination of paper currency. Electronic verification systems are available wherein apparatus is provided for progressively scanning selected areas of the paper, converting the varying reflected light level into an electrical signal, electrically filtering the signal, and determining the genuineness and/or denomination of the paper when the appropriate filters respond in their proper sequence. As shown, the testing area 33 includes a high intensity lamp 41 connected to a voltage source 42, shown schematically as a battery, and a photocell 43 producing an input to a verification circuit 44.

After a predetermined period of time, sufficient to allow the verification circuit 44 to determine the genuineness of the document 12, the relay 39 times out and the contact 32 closes, again connecting the motor 29 to the D.C. source 31. The document 12 again moves on the belt 22 to the area of a gate 46 having a first position wherein the document continues to be transported on the belt and a second position (shown in dotted outline) for deflecting the document into a receiving bin 47. The gate 46 is rotated between its first and second position by means of a solenoid 48 mechanically connected to the gate by means of a linkage 49. Energizing the relay 48 is a signal from a random-signal generator 51 having as an input signal the output of the amplifier 26. The random-signal generator 51 includes a dial 52 for adjusting the number of documents diverted into the receiver bin 47. The sample rate is adjustable from 0%, that is none of the documents submitted to the system would be diverted to the receiver bin 47, to 100% wherein all documents submitted would be diverted. Since the output of the amplifier 26 occurs whenever a document is inserted through the opening 11, the input to the random-signal generator 51 is directly related to the number of documents submitted. With the input to the random-signal generator 51 related to the number of documents submitted, the generator can be simply a stepping switch adapted to be advanced one step each time a document interrupts the light beam from the lamp 23. The stepping switch is adjusted by means of the dial 52 such that after a selected number of documents have passed the lamp 23 the relay 48 is energized. For example, if the dial 52 is set at ten, then the relay 48 is energized on the tenth tap of the stepping switch after ten documents have passed the lamp 23.

A document deflected by the gate 46 slides down a chute 53 into the receiver bin 47 where it is held inaccessible except to authorized personnel having a key to the lock 17. As the document 12 passes a lamp 54, it interrupts a light beam impinging on a photocell 56 thereby generating an input to an amplifier 57 and a shut-down circuit 58. The output of the amplifier 57 energizes a relay 59 to close a normally open contact 61 and an alarm circuit, such as an illuminant 62, is energized. The illuminant 62 may be located remote from the machine itself in the area occupied by an operator. Energizing the illuminant 62 indicates to the operator that a document has been diverted into the receiver bin 47, and he is to proceed to open the panel 16 and remove the document for personal verification of its authenticity. The input signal to the shut-down circuit 58 returns the system to its inoperative condition and presets it for the next document.

A document not deflected by the gate 46 continues to move on the transportation belt 22 to the area of a gate 55 having a first position wherein the document continues to be transported on the belt and a second position (shown in dotted outline) that diverts the document to a tray 60 through the opening 14. The gate 55 is rotated from its first position to its second position by energizing a solenoid 65 mechanically connected to the gate by means of a linkage 63. Energizing the relay 65 is the output of the verification circuit 44 generated when the document checked in the testing area 33 was determined to be counterfeit. A document determined to be counterfeit by the verification circuit 44, that has passed the gate 46, is deflected by the gate 55 to the tray 60 by means of a slide 64. As the document passes a lamp 66, it interrupts a light beam to a photocell 67 that generates an input signal to a shut-down circuit 68 that is similar to and performs the same function as the shut-down circuit 58.

A document that passes the gate 46 and has been determined to be genuine by the verification circuit 44 continues on the belt 22 until it is deposited in a receiver bin 69. As the document 12 passes a lamp 71, it interrupts a light beam to a photocell 72 thereby generating an input signal to change apparatus 73, merchandising apparatus 74, merchandise plus change apparatus 76, and a shut-down circuit 77. The shut-down circuit 77 is similar to and operates the same as the circuits 58 and 68 and returns the system to its initial inoperative condition ready to receive a subsequent document.

The blocks identified by the numerals 73, 74, and 76 show a few of the various functions that can be performed when a document has been placed into the receiver bin 69. For example, if a dollar bill passes the lamp 71, the change apparatus 73, of which there are various known types, delivers to the customer a dollars worth of metal coin change. Or the merchandise apparatus 74 delivers a dollars worth of merchandise or services to the customer, and mechanism of this type is likewise known. Still again, the apparatus 76 can be actuated to deliver merchandise plus metal coin change to the customer.

Thus, a document 12 inserted into the opening 11 is transported on the belt 22 to the testing area 33. In the testing area 33, the verification circuit 44 determines whether the bill is genuine or a counterfeit. Verification circuits are available, as mentioned previously, that can detect substantially all Class 3 counterfeits and some Class 2 counterfeits. After the verification circuit 44 has determined the genuineness of the document 12, it again moves through the system on the transportation belt 22 to the gate 46 which is randomly operated from its first to its second position by energizing the solenoid 48 with a signal from the random-signal generator 51. Documents selected to be sampled are diverted by the gate 46 into a receiver bin 47 and actuate an alarm 62 by passing the lamp 54. The illuminant 62 indicates to an operator that a sample document is in the receiver bin 47, and he is expected to retrieve the document through the panel 16 for personal verification of its genuineness. An experienced operator being able to detect all Class 3 counterfeits, substantially all Class 2 counterfeits, and some Class 1 counterfeits.

If the documents 12 has not been selected for sampling, it continues to move on the belt 22 to the gate 55 which is operated to divert counterfeit bills to the tray 60 by energizing the relay 65 on the output of the verification circuit 44. A document determined to be genuine and not sampled by the gate 46 continues to move on the transportation belt 22 until it is deposited in a receiver bin 69. As the document 12 enters the receiver bin 69, it interrupts a light beam from the lamp 71 to signal a specific function circuit, of which three are known.

Figure 2:
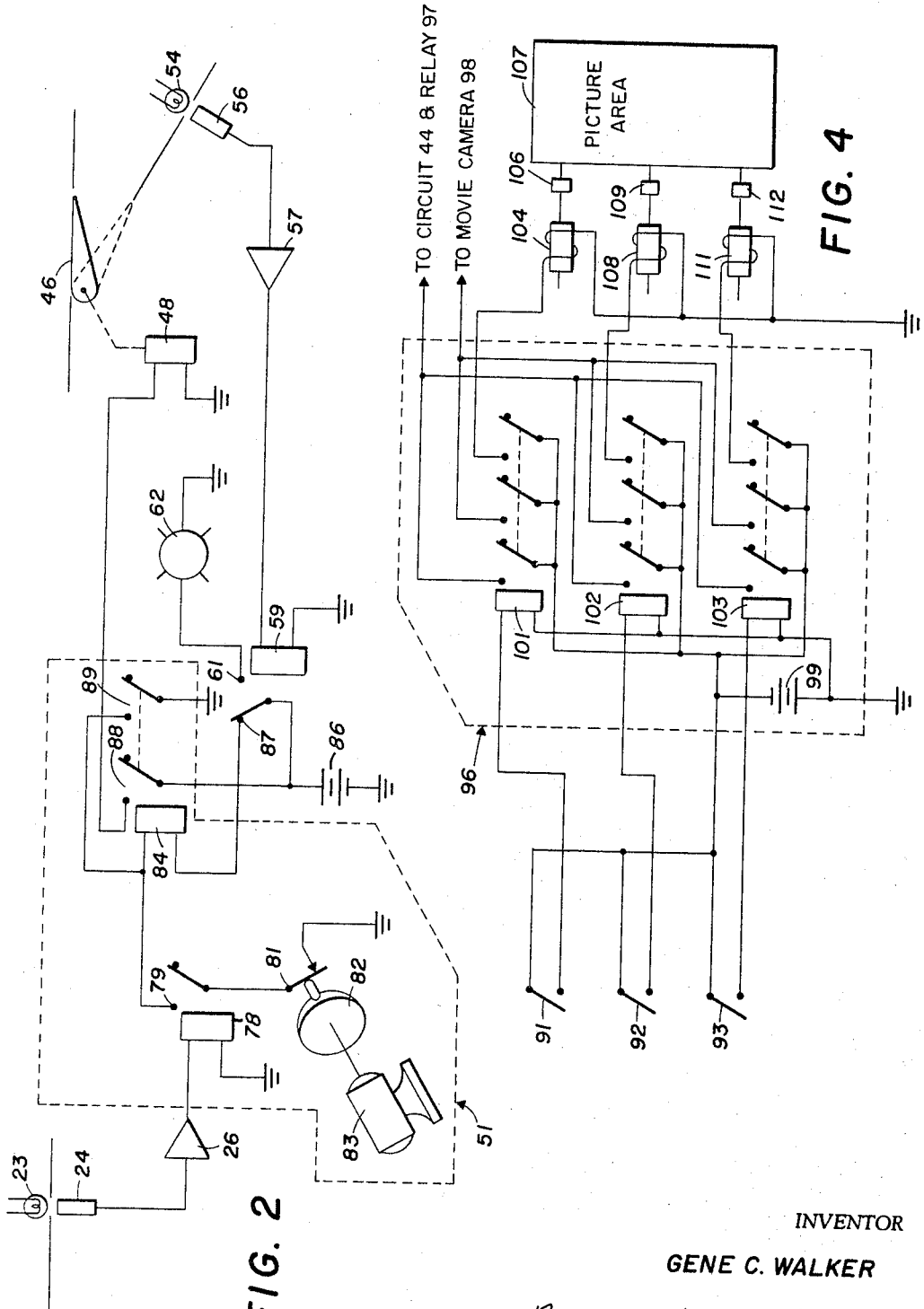
FIGURE 2 is a schematic of a random signal generator for the system of FIGURE 1.

Referring to FIGURE 2, there is shown a random signal generating system including a photocell 24 responsive to interruptions in the light beam from a lamp 23 and generating an input signal to an amplifier 26. The output of the amplifier 26 energizes a relay 78 included in the signal generator 51 (shown in dotted outline), to close a normally open contact 79 in series with a cam operated switch 81. The cam operated switch 81 is closed once each revolution of a disk 82 coupled to the shaft of a motor 83. Closing the normally open contact 79 at the instant the switch 81 is closed connects a relay 84 to a voltage source 86, shown schematically as a battery, through a normally closed contact 87. Connecting the relay 84 to the voltage source 86 energizes the relay coil thereby closing normally open contacts 88 and 89; the relay 84 is held in its energized condition after either the contact 79 or the switch 81 is opened through the closed contact 89. Closing the contact 88 connects the voltage source 86 to a solenoid 48 mechanically coupled to a gate 46 by means of linkage 49. Energizing the solenoid 48 rotates the gate 46 from the position shown to a second position (indicated in dotted outline). The solenoid 48 remains energized through the closed contact 88 until the light beam impinging on a photocell 56 from a lamp 54 is interrupted thereby generating an input signal to an amplifier 57. The output of the amplifier 57 energizes a relay 59. Energizing the relay 59 opens the contact 87 and closes a normally open contact 61 to connect an illuminant 62 to the voltage source 86. Opening the contact 87 disconnects the relay 84 from the source 86 and the contact 88 returns to its normally open position thereby de-energizing the solenoid 48 and the gate 46 in turn returns to the position shown.

In conjunction with the system of FIGURE 1, the system of FIGURE 2 operates as follows. A document inserted through the opening 11 interrupts a light beam from the lamp 23 thereby energizing the relay 78 and closing the contact 79. If the document passes the lamp 23 at the same time the switch 81 is closed, the gate 46 will be rotated by the energized solenoid 48 and the document will be diverted into the receiver bin 47 after it passes through the testing area 33. The gate 46 remains open even though the contact 79 opens after the document 12 passes the lamp 23 and the switch 81 opens as the disk 82 continues to rotate. The fact that the gate 46 has been opened is not indicated to the customer in any manner so that he does not know his document has been selected for personal verification. This in itself is a deterrent to questionable characters submitting documents known to be counterfeit since they have no way of determining whether or not the document they have submitted is to be personally verified.

A document opening the gate 46 continues through the testing area 33 until it reaches the opened gate wherein it is diverted onto the chute 53 and to the receiver bin 47. It is only after the document passes the lamp 54 that anyone is aware that it has been selected for personal verification, the announcement being made by means of the illuminant 62. Thus, a signal generating system of the type shown in FIGURE 2 randomly selects documents for verification, and the document selected is not determinable before being submitted since there is no set pattern. It is possible that every document submitted to the system would be selected for sampling or, on the other hand, none of the documents submitted would be selected for personal verification. The complete randomness of the system is one of its outstanding features.

Figure 3:
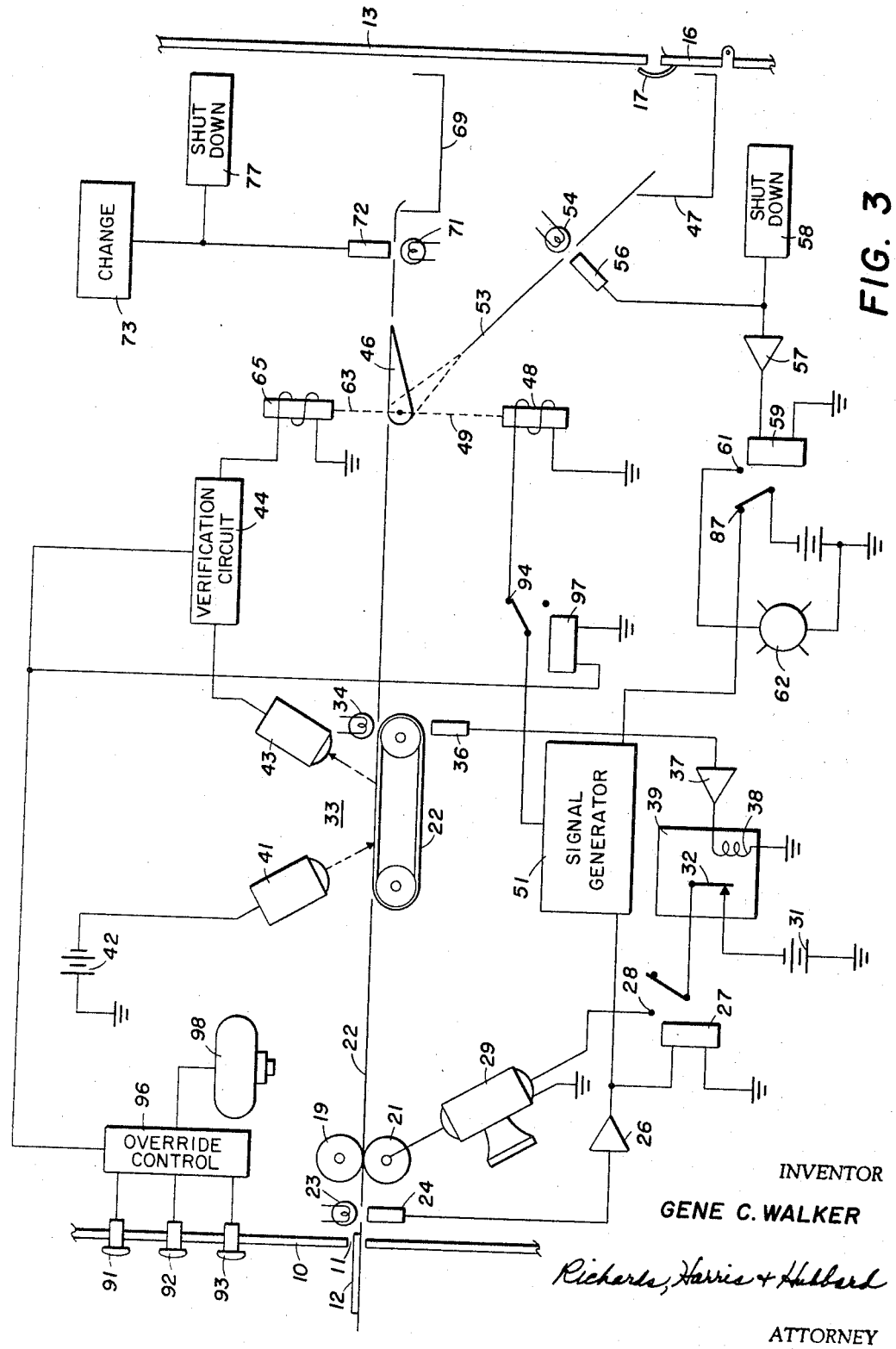
FIGURE 3 is a schematic of a document security system wherein randomly sampled documents and counterfeit documents are stored for operator verification and genuine documents not randomly sampled actuate a change making device.

Referring to FIGURE 3, there is shown another embodiment of a document verification system similar to FIGURE 1 and wherein the same reference numerals are used for elements appearing in both figures. A housing, largely broken away, containing the verification system, includes a front wall 10 having an opening 11 through which a document 12 is inserted and a plurality of key operated switches 91, 92, and 93 mounted therein. The housing also includes a rear wall 13 having a hinged panel 16 secured by means of a lock 17. The document 12 is inserted through the opening 11 and interrupts a light beam to a photocell 24 generated by a lamp 23. The photocell 24 connects to an amplifier 26 the output of which is connected to a relay 27 having a normally open contact 28 and to a random signal generator 51 of the type shown and described with reference to FIGURE 2. Closing the normally open contact 28 connects a motor 29 to a voltage source 31 through a normally closed contact 32 of a timing-out relay 39. The motor 29 drives a pair of transporting rollers 19 and 21 and a belt system 22.

The document 12 is transported on the belt system 22 to a testing area 33 that includes a high intensity lamp 41 connected to a voltage source 42 and a photocell 43 connected to a verification circuit 44. When the document 12 is properly positioned in the testing area 33, it interrupts a light beam to a photocell 36 from a lamp 34 thereby energizing a relay coil 38 in the timing-out relay 39 through an amplifier 37. The belt system 22 is stopped when the energized coil 38 opens the contact 32, and the document 12 is checked for genuineness in the testing area 33. After a predetermined period of time, the relay 39 times out and the contact 32 is again closed and the belt 22 again transports the document 12 through the system.

When the document 12 leaves the testing area 33, it is transported to a gate 46 having a first position as shown and a second position shown in dotted outline. The gate 46 is rotated from its first to its second position by a mechanical connection to a solenoid 48 through a linkage 49 and to a solenoid 65 through a linkage 63. The solenoid 48 is energized by a signal from the random-signal generator 51 through a normally closed contact 94, and the solenoid 65 is energized by a signal from the verification circuit 44 if it has been determined that the document 12 is a counterfeit or that it cannot be positively identified as authentic. Thus, in FIGURE 3, the gate 46 is opened either for the random sample operation or for a counterfeit document.

Opening the gate 46 directs the document 12 from the belt 22 to a chute 53 and into a receiver bin 47. As the document 12 slides toward the receiver bin 47, it interrupts a light beam impinging on a photocell 56 from a lamp 54. Interrupting the light beam to the photocell 56 generates a signal from an amplifier 57 to energize a relay 59 thereby opening a normally closed contact 87 to de-energize the solenoid 48, if it has been energized, and closing a contact 61 to energize an illuminant 62 to indicate to an operator a document has been directed to the receiver bin 47. The signal from the photocell 56 also activates a shut-down circuit 58 to return the system to its inoperative condition.

When the gate 46 is in its first position, the document 12 moves on the transportation belt 22 until it enters a receiver bin 69 after interrupting a light beam to a photocell 72 from a lamp 71. A document interrupting the light beam to the photocell 72 has been determined to be authentic by the testing area 33 and has not been selected for sampling by the random signal generator 51. The signal from the photocell 72 actuates a make change apparatus 73 and energizes a shut-down circuit 77 similar in construction and operation to the shut-down circuit 58.

A document directed into the receiver bin 47 is retrieved therefrom by an operator having a key to the lock 17 through the panel 16. If the operator determines the document taken from the receiver bin 47 is authentic, he may then reintroduce it into the system through the opening 11 and immobilize the gate 46 by placing his personal key into one of the key switches 91, 92, or 93. The key switches 91, 92, and 93 are connected to an override signal generator 96 connected to the verification circuit 44, a relay 97 and a movie camera 98. Closing any one of the key switches energizes the relay 97 thereby opening the contact 94 and disconnecting the solenoid 48 from the signal generator 51. Similarly, a relay (not shown) in the verification circuit 44 opens a normally closed switch to disconnect the solenoid 65 from its source of energizing voltage. Thus, so long as an operator has closed one of the key switches, the gate 46 is fixed in its first position and all documents submitted to the system will be transported to the receiver bin 69. Closing any one of the key switches also generates a signal to activate the movie camera 98 to photograph documents passed through the system when in an override condition. The camera 98 being arranged to not only photograph the document as it passes on the belt 22, but also mark on each picture a mark identifying the key operated switch used to immobilize the gate 46.

Photographing the documents passed through the system in the override condition along with an identifying mark discourages collusion of counterfeit passers with authorized personnel. Each operator authorized to enter the system and retrieve a document from the receiver bin 47 is assigned his own personal key that operates only one of the key operated switches. Thus, although more than one operator is authorized to enter the panel 16, when he passes a document through the system in an override condition his identity is recorded on film along with the documents he passes.

Referring to FIGURE 4, there is shown a system for identifying the operator who uses the override feature of the system of FIGURE 3. The key operated switches 91, 92, and 93 have one common connection to a source of voltage 99, illustrated as a battery. The switch 91 is connected to a relay 101 having three normally open contacts, the switch 92 is connected to a relay 102 having three normally open contacts, and the switch 93 is connected to a relay 103 also having three normally open contacts. The first two contacts of the relays 101, 102 and 103 serve to energize the verification circuit 44, the relay 97, and the movie camera 98. The third normally open contact of the relay 101 is connected to a solenoid 104 having a flag 106 that extends to the picture area 107 when the solenoid is energized. Closing the third normally open contact of relay 102 energizes a solenoid 108 that extends a flag 109 into the picture area 107. Likewise, closing the third normally open contact of the relay 103 energizes the solenoid 111 that extends a flag 112 into the picture area 107. Thus, when an operator inserts his key into his assigned key operated switch, he automatically extends a flag into the area photographed by the camera 98. This flag appears in all the pictures taken by the camera 98 and can be readily used to identify a particular operator.

While several embodiments of the invention, together with modifications thereof, have been described in detail herein and shown in the accompanying drawings, it will be evident that various further modifications are possible in the arrangement and construction of its components without departing from the scope of the invention.

What is claimed is:

1. A counterfeit document security system comprising:
   a housing,
   a testing area in said housing to determine the genuineness of said document,
   a first receiving bin for holding documents determined to be genuine by said testing area,
   gating means for deflecting a document from said first bin,
   a second receiving bin for documents deflected by said gating means,
   means for actuating said gating means when said testing area determines a document to be counterfeit, and
   means for randomly actuating said gating means to deflect a random sample of documents from said testing area into said second receiver bin.

2. A counterfeit document security system as set forth in claim 1 including alarm means responsive to the deflection of a document into the second receiver bin.

3. A counterfeit document security system as set forth in claim 1 including override means for immobilizing said gating means to direct all documents into said first receiver bin.

4. A counterfeit document security system as set forth in claim 3 including means for permanently recording an identification of all documents transported into said first receiver bin with said override means.

5. A counterfeit document security system comprising:
   a housing,
   a testing area in said housing for determining the genuineness of a document submitted thereto,
   means for transporting a document to and from said testing area,
   a first receiver bin for storing documents determined to be genuine in said testing area,
   a gate for deflecting documents from said first receiver bin,
   a second receiver bin for storing documents deflected by said gate,
   a signal generator for producing randomly spaced signals,
   means responsive to said random signals to actuate said gate, and
   means for actuating said gate when said testing area determines a document is not genuine.

6. A counterfeit document security system as set forth in claim 5 wherein said signal generator includes means responsive to the number of documents submitted to said security system to produce a signal to actuate said gate to deflect a given proportion of the total documents submitted into the second receiver.

7. A counterfeit document security system as set forth in claim 6 including an alarm responsive to the deflection of a document into said second receiver bin.

8. A counterfeit document security system as set forth in claim 7 including override means for disconnecting said testing area and said signal generator from said gate thereby transporting all documents into said first receiver bin.

9. A counterfeit document security system as set forth in claim 7 including a plurality of key operated override switches, and means actuated by any one of said override switches to disconnect said testing area and said signal generator from said gate to thereby transport all documents into said first receiver bin.

10. A counterfeit document security system as set forth in claim 9 including means for permanently recording all documents transported into said first receiver bin by said override switches along with an identification of the particular key operated switch used to actuate said disconnect means.

11. A counterfeit document security system as set forth in claim 10 including means responsive to the storing of a document in said first receiver bin to actuate a dispensing mechanism.

12. A counterfeit document security system comprising:
   a housing,
   a testing area in said housing for determining the genuineness of a document, a first receiver bin for storing a document determined to be genuine in said testing area, first gating means for deflecting documents determined to be counterfeit in said testing area, a second receiver bin for storing documents deflected by said first gating means, second gating means for deflecting documents from said first and second receiver bins, a third receiver bin for storing documents deflected by said second gating means, means for randomly actuating said second gating means to deflect a document into said third receiver bin, and means connected to said testing area for actuating said first gating means to deflect a document into said second receiver bin.

13. A counterfeit document security system as set forth in claim 12 including an alarm responsive to a document entering said third receiver bin.

14. A counterfeit document security system as set forth in claim 13 including override means for immobilizing said second gating means and said first gating means to transport all documents into said first receiver bin.

15. A counterfeit document security system as set forth in claim 14 including means for adjusting said random signal generator to vary the sequence of operation of said second gating means.

References Cited

UNITED STATES PATENTS

| | | | |
|---|---|---|---|
| 2,896,763 | 7/1959 | Gisser et al. | 209—111.7 X |
| 2,922,893 | 1/1960 | Ett | 209 |
| 2,950,799 | 8/1960 | Timms | 209 |
| 3,072,237 | 1/1963 | Simjian | 194—4 |

ALLEN N. KNOWLES, *Primary Examiner.*

U.S. Cl. X.R.

209—11.7